W. A. TURBAYNE.
SYSTEM OF ELECTRICAL DISTRIBUTION.
APPLICATION FILED DEC. 18, 1917.
1,374,041.
Patented Apr. 5, 1921.
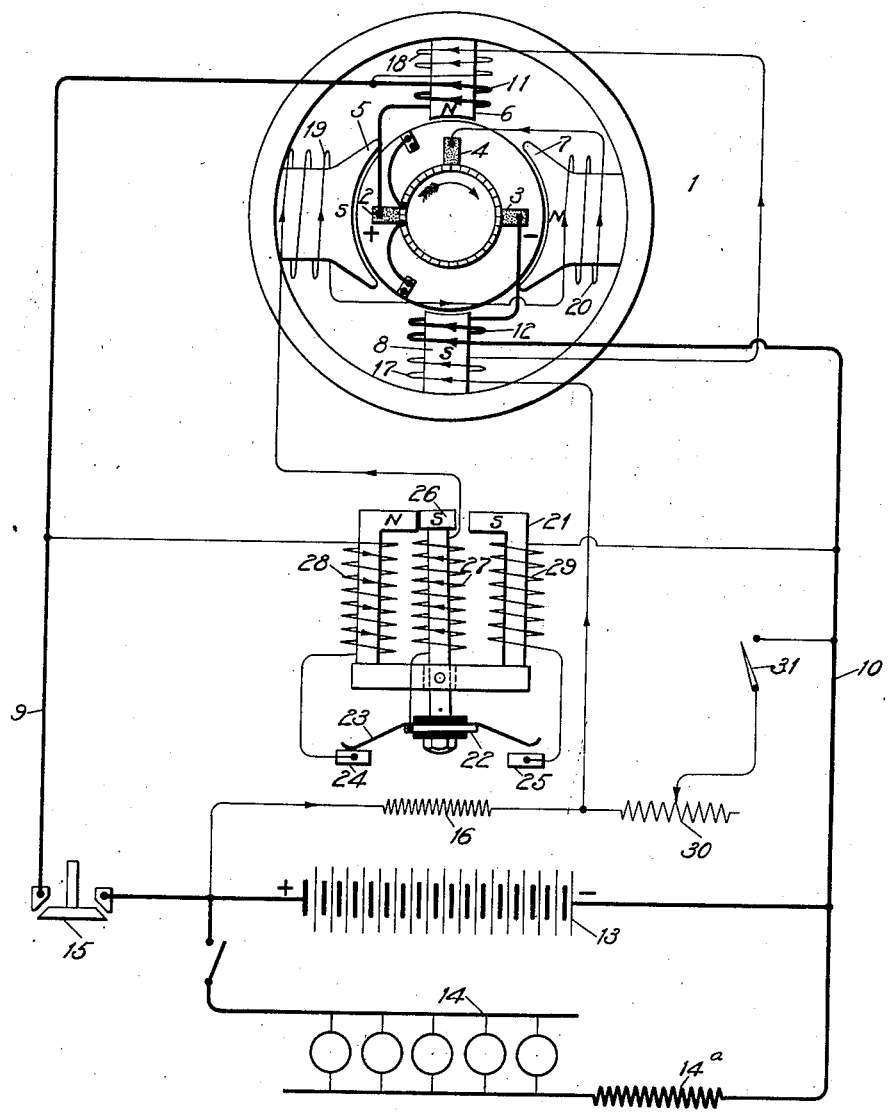
WITNESS:
Romaine A. Kinne
Ralph Munden
INVENTOR.
William A. Turbayne
BY Raymond H. Van Nest
ATTORNEY.

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

SYSTEM OF ELECTRICAL DISTRIBUTION.

1,374,041.          Specification of Letters Patent.          Patented Apr. 5, 1921.

Application filed December 18, 1917. Serial No. 207,743.

*To all whom it may concern:*

Be it known that I, WILLIAM A. TURBAYNE, a citizen of the United States, residing at Niagara Falls, in the county of Niagara and State of New York, have invented new and useful Improvements in Systems of Electrical Distribution, of which the following is a specification.

The present invention relates to systems of electrical distribution.

More particularly the present invention relates to systems of electrical distribution applicable to the lighting of railway cars.

In such systems a variable speed generator furnishes current to supply a storage battery and lamp circuit connected in parallel. When the generator is at rest or is not developing sufficient voltage to supply the lamps, the storage battery may discharge to supply said lamps. In such systems the generator is subject to reversal so that some means must be provided for maintaining the polarity on the generator unchanged. The present invention relates to the same general subject-matter as application No. 144,971, filed January 27, 1917, for systems of electrical distribution by the present applicant. In certain respects the present application covers improvements over the system disclosed in said application, whereby improved regulation is provided for.

One of the objects of the present invention is to provide a system involving a reversible generator in which the polarity of the generator will be maintained constant, regardless of reversals in direction of armature rotation and in which inherent regulation will be provided for, regardless of the direction of rotation.

A further object is to provide a system having a reversible generator in which regulation is provided through the effects of armature reaction and in which said effects of armature reaction will be controlled, regardless of the direction of armature rotation.

A further object is to provide a system involving a reversible generator and having the regulating characteristics referred to in which picking up of said generator will be facilitated.

A further object is to provide a system of the nature above referred to in which the output of the generator may be reduced to a predetermined value upon the attainment of predetermined conditions.

Further objects will be apparent as the description proceeds.

The one figure of the drawing represents diagrammatically one embodiment of the present invention.

The dynamo-electric machine 1 is provided with two main brushes 2 and 3. An auxiliary brush 4 is provided, located 90 electricals degres from the main brushes 2 and 3. The embodiment of the invention illustrated is a bipolar machine, though it has four pole pieces numbered 5, 6, 7 and 8. Though a bipolar machine is illustrated, it is to be understood that the invention is not to be limited to a bipolar machine but may be embodied in a machine having any practicable number of poles.

Main brushes 2 and 3 are connected to the mains 9 and 10 through compensating windings 11 and 12 respectively. As will be apparent from the drawings, the compensating windings 11 are located upon the pole piece 6, while compensating windings 12 are located upon pole piece 8. Connected across mains 9 and 10 are the storage battery 13 and the lamp circuit 14. The lamp circuit 14 may have a regulator 14ª of any preferred construction for maintaining constant voltage on the lamps. In the main 9 there is illustrated an automatic switch 15 which will be located between the dynamo-electric machine and the storage battery 13. This automatic switch 15 may be of any preferred construction but should operate to close the circuit between the dynamo electric machine 1 and the storage battery when the voltage developed by said machine is equal to or greater than the C. E. M. F. of said battery, and should automatically open when the voltage developed by said dynamo-electric machine 1 falls below the voltage of said battery. Bridging the contacts of the automatic switch 15 is a circuit including the resistance 16 and the field windings 17 and 18. As will be noted, the winding 17 is located on pole piece 8, while winding 18 is located on pole piece 6. Pole pieces 5 and 7 are provided with windings 19 and 20 which are connected in series with each other and to the auxiliary brush 4.

A field selector switch is indicated as a whole by the numeral 21. Said field selector switch is provided with an insulated rocking member 22, provided with a leaf spring 23 which is adapted to contact at its opposite ends with the stationary contacts 24 and 25. Movement of the rocking contact 22 is controlled by the magnetic member 26 which forms a part thereof. The magnetic member 26 is adapted to be magnetized by the coil 27. Coils 28 and 29 are located on opposite sides of the magnetic member 26 and are adapted to coöperate with the coil 27 to control the position of the magnetic member 26 in a manner which will be described more fully hereinafter. Circuit may be traced from the auxiliary brush 4 through windings 20 and 19 to coil 27 of the field selector switch to the leaf-spring 23. From the leaf-spring 23 circuit may be traced on the one side through contact 24, coil 28, windings 11, back to brush 2 and on the other side, through contact 25, coil 29, winding 12, back to brush 3. Connected to the circuit containing the resistance 16 and field windings 17 and 18 at a point between said resistance and said windings, is an adjustable resistance 30. This adjustable resistance 30 is connected through switch 31 to the opposite side of the storage battery 13, to which the resistance 16 is connected. The switch 31 is illustrated in diagrammatic form. It will be understood that such switch 31 should be automatically operated. The means for operating said switch 31 constitutes no part of the present invention, but said means should operate to move said switch upon the attainment of predetermined conditions, as when the storage battery has received substantially full charge. Various devices are well known for operating relays in response to the state of battery charge, any one of which may be used to operate said switch 31, as for instance, an ampere hour meter connected in series with the storage battery to measure the net input thereto.

When the generator is at rest or has its armature rotating at a low speed, the leaf-spring 23 will constrain the magnetic member 26 to occupy a central position. Said leaf-spring 23 will contact with stationary contacts 24 and 25 at this time. The automatic switch 15 will be open at this time. Under this condition, current will flow from the positive pole of the storage battery 15 through resistance unit 16, through windings 17, 18, through windings 11, armature of the dynamo-electric machine, winding 12, back to the negative terminal of the storage battery. Though the current flowing in windings 11 and 12 will set up opposing M. M. F.'s to those produced by the windings 18 and 17, their effect will be negligible, inasmuch as said windings 11 and 12 will consist of a relatively low number of turns compared with windings 17 and 18. This current flowing through windings 17 and 18 will make pole 6 of one polarity, indicated as north, and pole 8 of the opposite polarity, indicated as south. Rotation of the armature 1 in the direction indicated by the arrow will develop an E. M. F. effective on the brushes 4 and 2, brush 2 being positive and brush 4 negative. Consequently, a current will flow through brush 2, windings 11, coil 28 of the field selector switch, contact 24 and leaf-spring 23 to coil 27. From the coil 27 circuit may be traced through windings 19 and 20 to the auxiliary brush 4. This current flowing through field windings 19 and 20 will make pole 5 of one polarity, indicated as south and pole 7 of the opposite polarity, indicated as north. An E. M. F. will now be developed across brushes 2 and 3. Current will now pass from brush 2 through windings 11, coil 28 of the field selector switch, contact 24, leaf spring 23, contact 25, through coil 29, through winding 12, to the brush 3. Coöperation of the coils 27, 28, 29 will throw the magnetic member 26 in a counter-clockwise direction, whereby contact will be opened between leaf-spring 23 and stationary contact 25, while leaf spring 23 and stationary contact 24 will be more firmly engaged. Thereafter, while the armature continues to rotate in the direction indicated by the arrow, the field windings 19 and 20 will be connected across main brushes 2 and auxiliary brush 4, while compensating windings 11 will be connected in circuit to control the effects of armature reaction. At this time, inasmuch as contact is broken between leaf spring 23 and contact 25, compensating winding 12 will be open-circuited.

Inasmuch as compensating winding 11 will oppose the effects of armature reaction, picking up of the generator 1 will be facilitated. As the generator speeds up, higher voltage will be developed across brushes 2 and 3, and automatic switch 15 will close, connecting the battery and work circuit across these brushes through windings 11 and 12. When the automatic switch closes, resistance 16 and field coils 17 and 18 will be short circuited and removed from effective coöperation with the other elements.

Current from the dynamo electric machine through brushes 2 and 3 will develop a magnetic flux having a vertical component at right angles to the horizontal flux imparted by windings 19 and 20. This armature cross flux will tend to make pole piece 6 a south pole and pole 8 a north pole. This cross flux will therefore act to raise the potential of auxiliary brush 4 so that any tendency to increase the current supplied to the outside circuit, brought about for instance, by increasing speed, will be compensated for by a reduced E. M. F. across brushes 2 and 4 across which the main field windings 19 and 20 are connected. Compensating windings 11 and 12 will control the armature cross flux, whereby a predetermined characteristic may be obtained.

It will be clear that if the armature of the dynamo-electric machine 1 should start up in a direction opposite to that indicated by the arrow, the polarities of windings 19 and 20 will be reversed, whereby pole piece 7 will now be south pole and pole piece 5 will now be north pole, which, with the reversed direction of rotation, will cause main brushes 2 and 3 to be of unchanged polarity. Current in the coil 27 of the field selector switch will be reversed, whereby the magnetic member 26 will now be thrown in a clock-wise direction, whereby the main field windings 19 and 20 will now be connected across auxiliary brush 4 and main brush 3, through compensating winding 12. Compensating winding 12 will now operate in a manner similar to that disclosed above in connection with compensating winding 11, whereby to oppose armature cross flux due to field current.

The connections of the compensating windings 11 and 12 should be particularly noted. Inasmuch as winding 11 carries the field current under one direction of rotation and winding 12 carries the field current under the opposite direction of rotation, the compensating effect will be present, regardless of the direction of rotation.

When predetermined conditions have been reached upon which the switch 31 should operate, said switch 31 will close automatically. Closure of said switch 31 again throws windings 17 and 18 into operative circuit, whereby current will flow through said windings but in a reverse direction from that indicated by the arrowheads, which show the current direction when the machine is at rest or just commencing to rotate. The circuit through said windings 17 and 18 may now be traced as follows. From the positive brush 2, through compensating winding 11, winding 18, winding 17, through adjustable resistance 30, switch 31, compensating winding 12, to negative brush 3. The current in windings 17 and 18 will assist armature reaction to reduce the E. M. F. developed across main field windings 19 and 20 and cause a reduction in the main field current. By manipulation of the adjustable resistance 30, the output may be controlled, whereby the battery may be caused to substantially float across the generator brushes.

One embodiment of the present invention has been described in detail. Many modifications will occur to those skilled in the art. It is intended in this patent to cover all such modifications that come within the scope of the invention as defined by the appended claims.

What I claim as new and desire to secure by Letters Patent of the United States is:—

1. In combination, a variable speed generator having main brushes and an auxiliary brush, means for causing a difference in polarity to exist between said auxiliary brush and one of said main brushes, main field windings, means responsive to the direction of armature rotation for selectively connecting said main field windings between said auxiliary brush and one or the other of said main brushes, a circuit connected to the said main brushes containing a plurality of series windings adapted to control the effects of armature reaction, one of said series windings being connected in circuit with said main field windings in response to said second mentioned means.

2. In combination, a dynamo-electric machine having an armature, field poles provided with windings, auxiliary poles located 90 electrical degrees from said main poles, main brushes connected to said armature at substantially the points of maximum potential difference due to armature rotation in the flux produced by said main field windings, an auxiliary brush located 90 electrical degrees from said main brushes, switch means for selectively connecting said main field windings between said auxiliary brush and one or the other of said main brushes, each of said auxiliary poles being provided with a series winding connected to one of said main brushes and adapted to be connected in series with said main winding by said switch means.

3. In combination, a storage battery, a dynamo-electric machine having main field poles provided with windings, auxiliary poles energized from said battery spaced substantially 90 electrical degrees from said main poles, main brushes coöperating with said main poles, an auxiliary brush spaced 90 electrical degrees from said main brushes, windings on said auxiliary poles connected to said main brushes, and selective means for completing a circuit from said auxiliary brush through one or the other of said auxiliary pole windings and said main pole windings to one of said main brushes.

4. In combination, main field poles, auxiliary field poles spaced 90 electrical degrees from said main poles, main brushes coöperating with said main field poles and an auxiliary brush spaced 90 electrical degrees from said main brushes, series windings on said auxiliary poles, main field windings on said main field poles and selective means for connecting said main field windings between said auxiliary brush and one or the other of said main brushes through one or the other of said series windings.

5. In combination, main field poles, auxiliary field poles spaced 90 electrical degrees from said main poles, main brushes coöperating with said main field poles and an auxiliary brush spaced 90 electrical degrees from said main brushes, series windings on said auxiliary poles, windings on said main field poles connected between said auxiliary brush and one of said main brushes through one of said series windings, and selective means for determining which of said main brushes and which of said series windings shall be connected in circuit with said main field windings.

6. In combination, an armature, windings for setting up a field flux, windings for setting up a second field flux spaced 90 electrical degrees from said first windings, the polarity of said second mentioned windings being responsive to the direction of armature rotation in said flux, series windings coöperating with said first mentioned windings and having substantially the same flux axes as said first mentioned windings, and means whereby under two alternative predetermined conditions of operation the relative effects of said first mentioned windings and said series windings may be reversed.

7. In combination, an armature, means for setting up a flux of constant polarity, main field windings energized from said armature to provide flux whose polarity is responsive to the direction of armature rotation, a plurality of means for compensating for the armature reaction, and means for selectively connecting said means in circuit in response to the direction of armature rotation.

8. In combination, an armature, main field windings, main brushes and an auxiliary brush, means for selectively connecting said main field windings between said auxiliary brush and one or the other of said main brushes in response to the direction of armature rotation, and means for compensating for armature cross flux responsive to said selective means.

9. In combination, an armature, main and auxiliary field windings, said auxiliary windings being energized to produce flux of constant polarity, main brushes and an auxiliary brush, series windings, said main field windings being adapted to be connected between said auxiliary brush through one or another of said series windings to one or another of said main brushes in response to the direction of armature rotation.

10. In combination, an armature, main and auxiliary field windings, said auxiliary windings being energized to produce flux of constant polarity, main brushes and an auxiliary brush, series windings, said main field windings being adapted to be connected between said auxiliary brush through one or another of said series windings to one or another of said main brushes in response to the direction of armature rotation, said series winding being adapted to compensate for the effects of armature reaction.

In witness whereof, I have hereunto subscribed my name.

WILLIAM A. TURBAYNE.